United States Patent [19]
Kevorkian

[11] 3,965,301
[45] June 22, 1976

[54] FOLDED SPACE-TIME-SPACE SWITCHING NETWORK

[75] Inventor: Kevork Kevorkian, Saint-Germain-en-Laye, France

[73] Assignee: International Standard Electric Corporation, New York, N.Y.

[22] Filed: Sept. 9, 1974

[21] Appl. No.: 504,124

Related U.S. Application Data

[63] Continuation of Ser. No. 436,610, Jan. 25, 1974, which is a continuation of Ser. No. 254,003, May 17, 1972.

[30] Foreign Application Priority Data
June 14, 1971 France .............................. 71.21457

[52] U.S. Cl. ......................... 179/15 AT; 179/18 EA
[51] Int. Cl.² ...................................... H04Q 11/04
[58] Field of Search......... 179/15 AT, 15 AQ, 18 E, 179/18 EA

[56] References Cited
UNITED STATES PATENTS
3,281,537  10/1966  Dupieux.......................... 179/15 AQ
3,542,960  11/1970  Schneider.......................... 179/18 E FOREIGN PATENTS OR APPLICATIONS
6,376  7/1966  Japan............................. 179/15 AQ Primary Examiner—David L. Stewart
Attorney, Agent, or Firm—J. B. Raden; D. P. Warner

[57] ABSTRACT

A switching network provides interconnections for time division channels utilizing a folded space-time-space network. The network modifies the ratios of operation frequency between space division switches and time division switches to increase the efficiency of transmission while minimizing the total volume of equipment.

4 Claims, 2 Drawing Figures

FOLDED SPACE-TIME-SPACE SWITCHING NETWORK

This is a continuation of application Ser. No. 436,610 filed Jan. 25, 1974 which is a continuation of application Ser. No. 254,003 filed May 17, 1972.

BACKGROUND OF THE INVENTION

1. Field of the Invention

The present invention relates to pulse code modulation (PCM) transmission and time division switching exchanges and, more particularly, to switching networks used in such exchanges.

2. Description of the Prior Art

PCM and TDM exchanges are well known. They make it possible to establish interconnections through time division trunk channels leading to a switching network, which is able to interconnect those channels.

In a known manner, if N is the number of trunks in an exchange as hereabove defined, and if P is the number of time division channels in each trunk, the Q bits, forming any message sample transmitted on one of the P channels of a trunk, are collected by a multiplexer. The multiplexer gets together P.Q bits from P time division channels to constitute a frame wherein, on the one hand, the Q bits of any sample and, on the other hand, the P samples from the P channels are serially transmitted to a unit called variously group equipment or supermultiplexer. Each supermultiplexer receives samples from R multiplexers in the form of distinct frames and provides at its output a higher rank multiplexing for those samples. The P.Q.R bits received from R multiplexers by a supermultiplexer are then transmitted via a switching network in the form of samples, each one grouping Q bits outgoing from one of the time channels.

SUMMARY OF THE INVENTION AND RELATED ART

The switching network which is the subject of the present invention is of the folded "space-time-space" division type. It comprises a space-division switch and time-division switches. Each one of K supermultiplexers included in the exchange is connected to, at least, one horizontal of the space-division switch. The time-division switch inputs and outputs are connected to the space-division switch verticals. The P.R samples collected in the P.R memory cells of a supermultiplexer are transmitted one by one, in one frame, to the group of time-division switches, then they are distributed in accordance with their destinations to transfer registers of other supermultiplexers, via the space-division switch, before being transmitted by the time division trunk channels that correspond to their destinations. Thus the space division switch provides "K.P.R."/2 different connection paths for each frame, each path accommodating two channels, one forward and the other backward.

K.P.R/2 of these samples, hereafter called first samples, are exchanged in the speech stores of the time division switch for K.P.R/2 samples, hereafter called second samples, passing in the reverse direction through the K.P.R/2 successive connection paths, each toward the suitable transfer register of a supermultiplexer. For example, A first samples, corresponding to the calling lines, are exchanged at cyclic times depending, for example, on their chronological arrival rank and the other first samples, corresponding to called lines, are exchanged at acyclic times, cyclic and acylic times being intricate. The K.P.R/2 first samples after passing through time division switch store are sent by K.P.R/2 different connection paths established through the space division switch to corresponding registers in involved supermultiplexers and, from there, to trunks which correspond to their different destinations.

In a known manner, the above mentioned supermultiplexers, time division switches and space division switch of a switching network have the same operation frequency that is a multiple of the sampling frequency, and the multiplexer frame duration is equal to the supermultiplexer frame duration.

A first purpose of this invention is to modify ratios of operation frequencies in the above mentioned units with the aim of offering a solution for the hereunder mentioned problem.

In fact, it is well known that for a given size of an exchange the total number of channels is equal to the product of the number R of multiplexers by the number P of time division channels in each multiplexer, assuming to simplify the description that each multiplexer is connected to P channels and that the total number of channels is a multiple of the number of multiplexers R. It is also known that it is not presently possible to build pure time division PCM exchanges in large sizes. Indeed, a pure time-division exchange corresponds to the case in which the number of trunks N = 1 and the switching network thereof may then schematized as including a time-division switch wherein speech signal store comprises P lines, each line being allotted to data from a channel and being cyclically activated at the frequency F. But the minimum duration $t$ of a read-write phase for a store line of given length is determined by the technology used in such a store. As a result it is conceivable that with a given store technology the number p of time-division channels that is equal to $1/Ft$ has a maximum value depending on the selected frequency F. Such a maximum value is rather low with presently employed frequencies, for example corresponding to P = 250 with F = 8 kHz and $t$ = 500 ns. That confines application of pure time division switching to small size exchanges and leads logically to the use simultaneously of time division switches and of space division switches provided that these switches are suitably combined for utilizing at the best advantages offered by either switch.

However time division switches and space division switches occupy a volume in the exchange, which volume increases with exchange size and causes pulse transmission links to lengthen. It is also known that due to the currently used frequencies such lengthening cannot be neglected because of additional capacitances and couplings and particularly because of increasing pulse propagation times between various points within the network. Indeed those drawbacks result in using additional compensation and synchronization devices and particularly in increasing the volume to be reduced.

Thus another purpose of the present invention is to reduce the volume of the switching network in order to make it possible to build large size PCM exchanges, the number of additional devices being limited.

In a PCM exchange combining time division switches and space division switches, that is practical stores and cross-point matrices, the switching network volume depends on switch volumes and on employed technologies. As a whole the volume of speech stores needed for a switching network comprising N.P channels is substantially constant because it depends on the total number of channels and may be considered as independent of the number of time division switches.

On the contrary, the volume of the space division switch depends on the number N, which would lead to select a solution where N is small and P is as large as possible in accordance with the previously mentioned requirements.

Therefore, the present invention provides a switching network for a large size PCM exchange that is designed to reduce the volume of the space division switch regarding the total exchange volume and to avoid transmission devices which would be needed in a conventionally designed exchange having the same capacity.

According to a feature of this invention, there is provided a switching network for a time division switching and PCM transmission exchange. The said exchange provides switching of samples made of bits supplied to K supermultiplexers from K.R. multiplexers that themselves are supplied by K.R.P time division channels. Each multiplexer provides multiplexing of samples from P time division channels. Each supermultiplexer provides multiplexing to a higher rank of samples from R multiplexers and includes a speech signal store having at least P.R lines or cells each being designed to store a time division channel sample. The K supermultiplexers are connected to horizontals of a space division switch whose verticals are connected to time division switches which provide time shifting for samples from supermultiplexers with view to their exchanges. The said time division switches having at least P.R./2 store lines or cells, each being designed to contain a channel sample and forming with the space division switch a so called folded space-time-space division switching network. The space division switch operation frequency being equal to a multiple of rank X of the operation frequency of supermultiplexers and of that of the time division switches.

According to another feature of this invention, each space division switch output vertical is connected to a number of time division switches at least equal to X and each space division switch horizonatal is connected to a number of supermultiplexers at least equal to X.

BRIEF DESCRIPTION OF THE DRAWINGS

Other features of this invention will appear more clearly from the following description of an embodiment, the said description being made in conjunction with the attached drawings, wherein.

DESCRIPTION OF PREFERRED EMBODIMENTS

Figure 1:
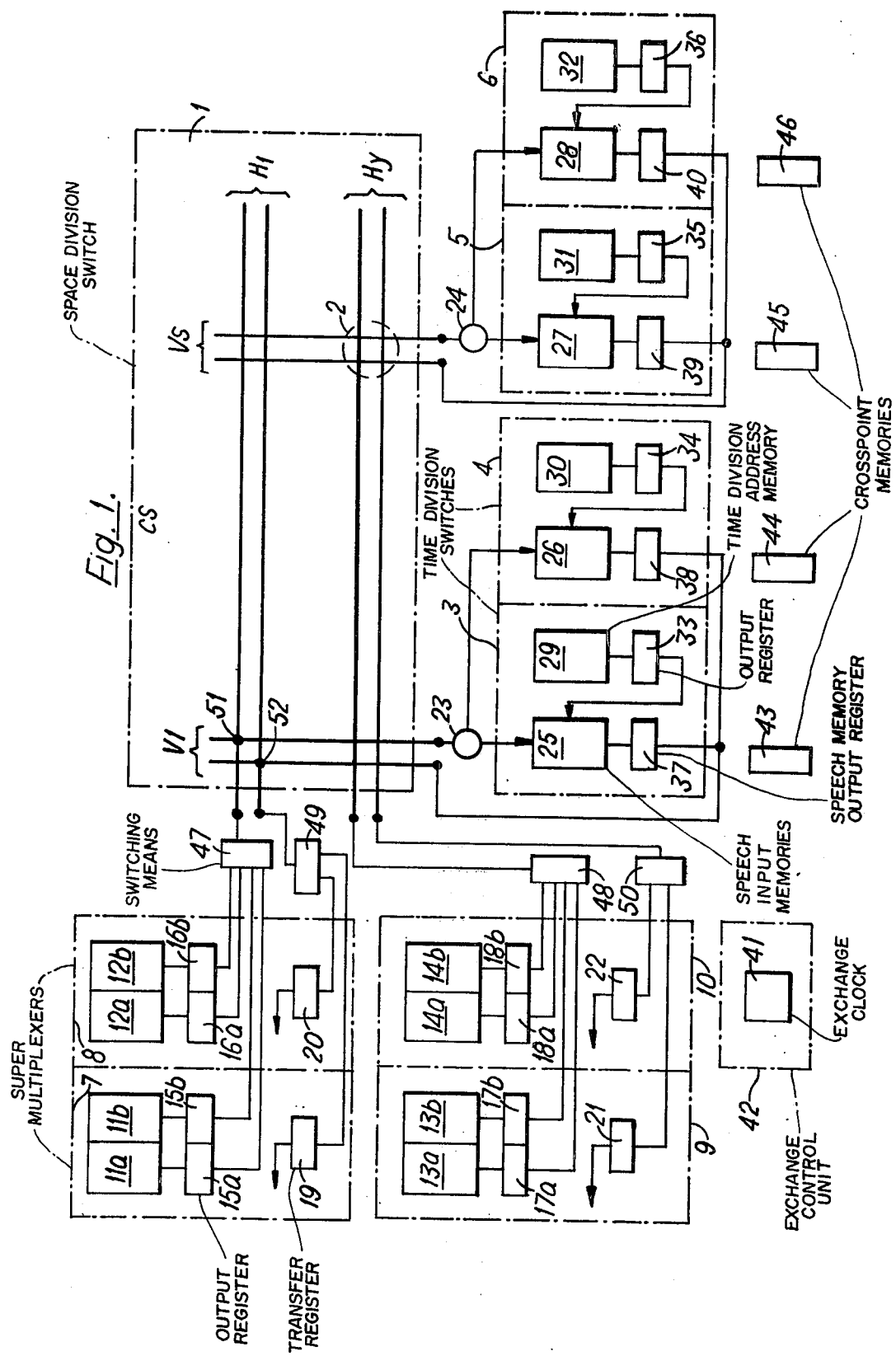
FIG. 1 is a block diagram of the speech channel switching network according to this invention.

The switching network for the time division switching and PCM transmission exchange of FIG. 1 comprises a space division switch 1 arranged as a crosspoint matrix of S verticals V and Y horizontals H. Each cross-point such as 2 includes 2.Q simultaneously controlled contacts Q being the number of bits forming a sample. X.S time division switches are X by X conected to S space division switch verticals, the number X being selected equal to two for the embodiment of the FIG. 1 wherein time division switches 3 and 4 are connected to the vertical V1 and time division switches 5 and 6 are connected to the vertical VS. X.Y supermultiplexers are X by X connected to Y space division switch horizontals and, in the FIG. 1, supermultiplexers 7 and 8 are connected to horizontal H1 and supermultiplexers 9 and 10 are connected to horizontal HY. Each supermultiplexer is connected to R multiplexers, each multiplexer delivering P.Q. bits per frame. The FIG. 1 shows, for each supermultiplexer, the memory for storing the P.Q.R bits forming a frame, such memories 11, 12, 13 and 14 corresponding respectively to the supermultiplexers 7, 8, 9 and 10.

In a preferred embodiment, as for example shown in the FIG. 1, each memory is made of two parts $a$ and $b$. Each part is connected to an output register such as part 11a to output register 15a and part 11b to output register 15b.

The Q outputs of each of the X multiplexer output registers for X supermultiplexers connected to one horizontal are connected to the Q horizontal inputs via first type switching means such as 47 for output registers 15a, 15b, 16a and 16b, and 48 for output registers 17a, 17b, 18a and 18b.

The Q inputs of each of the transfer registers of X supermultiplexers connected to one horizontal are connected to the Q horizontal outputs via second type switching means such as 49 for transfer registers 19, 20 and 50 for transfer registers 21, 22.

In another embodiment of the invention wherein channels are specialized, calling channel samples entering a supermultiplexer are stored in memory areas $a$ of speech signal memories, such as 11a for supermultiplexer 7, and called channel samples are stored in memory areas $b$ such as 11b. Then switching means comprise tow gates that are operated at cyclic times and two gates that are operated at acylic times, every gate being sequentially operated.

In the general case wherein the 2Q ends of each vertical V are, as above mentioned, connected in parallel to two time division switches, third type means, for example included in time division switch circuits and providing X different switching possibilities, are connected to Q outputs of each vertical so as to connect those Q outputs to the Q inputs of a time division switch for each one of the X possibilities.

Third type switching means are shown in 24 for vertical V1 and in 24 for vertical VS; they make it possible in each case to connect Q vertical outputs to switches 3 or 4 of V1 and to switches 5 or 6 for VS.

For each time division switch, the speech signal memory is shown wherein samples from supermultiplexers are delayed for fitting their time positions with respect to their transmission times. Such speech signal memories are shown in 25, 26, 27 and 28 for time division switches 3, 4, 5 and 6, respectively. Each memory is controlled via a time division address memory and by the clock of the exchange 41. Each time division address memory such as 29, 30, 31 and 32 for switches 3, 4, 5 and 6, respectively, provides data for each acyclic transmission via output register such as 33, 34, 35 and 36. Speech memory output registers are connected to Q ends of the vertical which corresponds to their switches such as 37 and 38 for switches 3 and 4, and 39 and 40 for switches 5 and 6.

The FIG. 1 shows also as a reminder the exchange control unit 42 including exchange clock 41 for synchronizing the space division switch and various memories in supermultiplexers and in time division switches.

Also as a reminder, there are shown crosspoint memories 43, 44, 45 and 46 designed to store cross-point addresses for operating them and establishing the selected connection path.

Figure 2:
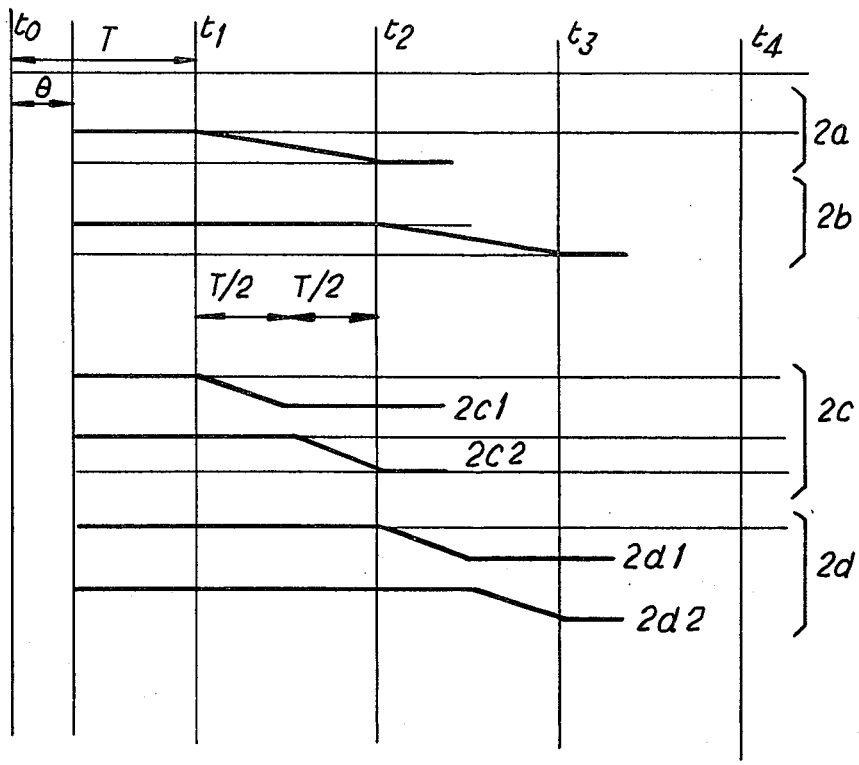
FIG. 2 is a time diagram including 4 parts 2a–1d, the parts 2a and 2b relating to a conventional switching network while the parts 2c and 2d relate to a switching network according to this invention.

The time diagram shown in the FIG. 2 enables operation of the network according to the invention to be described and compared with conventional network operation.

The graphs 2a and 2b relate to a conventional switching network while the graphs 2c and 2d relate to a switching network according to the invention.

In a preferred embodiment of a conventional switching network, operation time of supermultiplexers, time-division switches and space-division switches is T = 500 nanoseconds and the total time duration needed for reading a sample, for transferring it and for rewriting it is selected equal to 2T, whatever its transfer direction and the initial memory where it has been stored.

As shown in the graphs 2a and 2b, simultaneous reading of two samples, one from a calling trunk and the other from a called trunk, is initiated at time $t_o + \theta$ in a supermultiplexer, $\theta$ being the time duration needed for storing a sample into a transfer register provided for transferring samples to trunks after switching by the switching network. Sample reading is the phase corresponding to output of that sample from the memory cell wherein it is stored and to writing it into output register of the said memory. Transfer of a sample from a calling trunk is shown in 2a. It is triggered at a time T $- \theta$ after the beginning of its reading; a time duration T is given to it during which it progresses on the connection path selected for it. That connection path is established by operating for the time T the space-division switch cross-points, such cross-points being selected in a known manner by the control unit and the cross-point memory associated to the used time-division switch.

At the end of that time T, the transferred sample is stored for a time $\theta$ into the suitable memory cell of the used time-division switch, that is at a time 2T after the beginning of the reading.

Simultaneously, the sample that is stored in the suitable memory cell of the used time-division switch is read at the time $t_0$, then at time $t_1$, transfer thereof is triggered and performed during a time duration T following which it is stored for a time $\theta$ into the supermultiplexer sample transfer register.

As mentioned above, reading of a sample from a called channel is triggered simultaneously with that of the sample of calling channel having the same rank. Transfer thereof is only triggered at time $t_2$, that is at time $2T - \theta$ after having initiated reading thereof; transfer through the space-division switch is thus achieved at a time interval T after sample transfer for the same ranked calling channel, and storage into the concerned memory cell of the used time-division switch is triggered at time $t_3$; storage is also performed during time duration $\theta$. Thus called channel sample is transferred from supermultiplexer, where it has arrived, to time-division switch, where it is processed, in a time duration equal to 3T. Therefore, at each period, there are two simultaneous readings, one from supermultiplexer memory and the other from time-division switch memory; there are also two transfers in opposite directions through the same connection path; finally there are two writings, one into time-division switch memory and the other into multiplexer transfer register.

Graphs 2c and 2d respectively correspond, one to samples from calling channels and the other to samples from called channels. For example, assumption is made that samples whose graphs are shown in 2c1 and 2c2 are respectively from memory areas 11a and 12a of supermultiplexers 7 and 8 and that samples whose graphs are shown in 2d1 and 2d2 are respectively from memory areas 11b and 12b of the said supermultiplexers.

A single control order simultaneously at time $t_o + 0\, \theta$ controls to read samples 2c1, 2d1, 2c2, 2d2; those samples are transferred to their corresponding output registers 15a, 16a, 15b, 16b. Simultaneously, four indentical operations are triggered in time-division switch memories to provide reading of the four samples associated to the former four samples.

At times $t_1$ corresponding to a time duration $T - \theta$ after the reading order, the control unit, in conjunction with cross-point address memory of the used time-division switch, operates cross-points corresponding to the connection path for a first sample from a calling trunk; for example, cross-points 51 and 52 provide galvanic connections of two channels, each channel comprising 9 wires, between supermultiplexer 7 and time-division switch 3 via duly positioned switching means 23. Such cross-points allow sample transfer during a time duration T/2, at the end of which they are inhibited. At time $t_1 + T/2$, the concerned cross-point address memory operates cross-points concerning connection between supermultiplexer 8 and, for example, time-division switch 5 via duly positioned switching means 24. Those cross-points allow transfer of sample stored in register 16a to input of switch 5 within a time duration T/2. Simultaneously, within a time duration $\theta$ and from time $t_2$, the two samples sent by supermultiplexers 7 and 8 are stored into the suitable speech signal memory cell of their respective time-division switches. Simultaneously, at time $t_o + \theta$, exchange clock 41 triggers reading of the two samples that are to be transferred in the opposite direction with respect to the two samples whose graphs are 2c1 and 2c2. Still simultaneously, exchange clock 41 triggers through time-division address memories, such as 29 for 3, reading in concerned time-division switches of the two samples which are to be transferred in the direction opposite to the two samples whose graphs are 2d1 and 2d2. Samples whose graphs are 2d1 and 2d2 correspond to called channels and their transfer through switching network is only allowed from time $t_2$ for one and from $t_2 + \theta$ for the other, that is a period after transfer of sample from calling channel of same rank into concerned supermultiplexer memory. Storage into memory cells of time-division switches are performed from $t_3$ for both these samples. In a same manner, simultaneously with those operations, those concerning the two samples to be transferred in the opposite direction are triggered.

As a result, the number of sample transfers is doubled with respect to conventional network, which permits for obtaining the predetermined transfer level to design a space-division switch wherein the number of cross-points is divided by four with respect to that of a conventional network. Similarly, if there are X supermultiplexers per horizontal and X time-division switches per vertical of the space-division switch, it would be possible to keep the same space-division switch by increasing its operation frequency to the extent that time T/X is higher than the time needed for transferring samples through the said space-division switch. In that case, space-division switch operation frequency is X times that of time-division switches and supermultiplexers.

Of course this invention is not limited to and by the described embodiments.

What is claimed is:

1. A folded space-time-space switching network for a PCM switching exchange, comprising a space division switch including horizontals and verticals arranged to enable their interconnection through crosspoint switch means, means coupling each horizontal to X supermultiplexers, said supermultiplexers including means whereby each of a plurality of telephone lines can be coupled to an inlet terminal and to an outlet terminal of said space division switch to enable the exchange of PCM signals between the horizontals and selected telephone lines, and means coupling each vertical to X time division switches, said time division switches including means enabling the exchange of PCM signals between the verticals and the time division switches, the operating frequency of the space-division switch being selected to be at least X times that of the supermultiplexers and the time division switches, whereby the volume of the space division switch is minimal, as is the total volume of the combination of the space division switch and the time division switches.

2. The invention as claimed in claim 1, in which the means enabling the exchange of PCM signals between the verticals and the time division switches include means for providing time shifts to the PCM signals received from the verticals.

3. The invention as claimed in claim 2, in which the means for providing time shifts to the PCM signals include speech input memories for storing PCM signals received from the verticals, and speech memory output registers for transmitting PCM signals to the verticals following prescribed time periods.

4. A switching network for a time-division switching exchange for switching PCM signals, the said exchange comprising switching means for switching samples to and from K supermultiplexers, each supermultiplexer including a speech signal memory having at least $P.R$ cells designed to store in each cell a time-division channel sample, said switching means connecting the K supermultiplexers to horizontals of a space-division switch, means connecting verticals of the space-division switch to time-division switches which provide a time shift for samples from the supermultiplexers with the purpose of exchanging them, the said time-division switches including at least $P.R/2$ cells, each cell being designed to store a time-division channel sample, said time division switches forming with the space-division switch a folded "space-time-space" switching network, and said space-division switch having an operating frequency which is a multiple X times as great as that of the supermultiplexers and of the time-division switches to enable minimization of the size of the space division switches and therefore the total size of the combination of the space division switch and the time division switches.

* * * * *